Feb. 15, 1966   M. F. SANKOVICH   3,235,463
NUCLEAR REACTOR

Original Filed Jan. 31, 1958   10 Sheets-Sheet 1

INVENTOR.
Melvin F. Sankovich
BY
ATTORNEY

Feb. 15, 1966 M. F. SANKOVICH 3,235,463
NUCLEAR REACTOR
Original Filed Jan. 31, 1958 10 Sheets-Sheet 2

INVENTOR.
Melvin F. Sankovich
BY
*J. P. Moran*
ATTORNEY

Feb. 15, 1966   M. F. SANKOVICH   3,235,463
NUCLEAR REACTOR

Original Filed Jan. 31, 1958

INVENTOR.
Melvin F. Sankovich
BY
*JF Moran*
ATTORNEY

Feb. 15, 1966     M. F. SANKOVICH     3,235,463
NUCLEAR REACTOR

Original Filed Jan. 31, 1958     10 Sheets-Sheet 4

INVENTOR.
Melvin F. Sankovich
BY
*J.P. Moran*
ATTORNEY

Feb. 15, 1966　　M. F. SANKOVICH　　3,235,463
NUCLEAR REACTOR
Original Filed Jan. 31, 1958　　10 Sheets-Sheet 5

INVENTOR.
Melvin F. Sankovich
BY
ATTORNEY

Feb. 15, 1966  M. F. SANKOVICH  3,235,463
NUCLEAR REACTOR

Original Filed Jan. 31, 1958  10 Sheets-Sheet 6

INVENTOR.
Melvin F. Sankovich
BY
ATTORNEY

Feb. 15, 1966   M. F. SANKOVICH   3,235,463
NUCLEAR REACTOR
Original Filed Jan. 31, 1958   10 Sheets-Sheet 7

INVENTOR.
Melvin F. Sankovich
BY
*J. Moran*
ATTORNEY

Feb. 15, 1966   M. F. SANKOVICH   3,235,463
NUCLEAR REACTOR
Original Filed Jan. 31, 1958   10 Sheets-Sheet 8

INVENTOR.
Melvin F. Sankovich
BY
*JAMoran*
ATTORNEY

INVENTOR.
Melvin F. Sankovich
BY
ATTORNEY

Feb. 15, 1966   M. F. SANKOVICH   3,235,463
NUCLEAR REACTOR

Original Filed Jan. 31, 1958   10 Sheets-Sheet 10

INVENTOR.
Melvin F. Sankovich
BY
ATTORNEY

United States Patent Office 3,235,463
Patented Feb. 15, 1966

3,235,463
NUCLEAR REACTOR
Melvin F. Sankovich, Lynchburg, Va., assignor to The Babcock & Wilcox Company, New York, N.Y., a corporation of New Jersey
Continuation of application Ser. No. 712,512, Jan. 31, 1958. This application Oct. 9, 1961, Ser. No. 145,012
4 Claims. (Cl. 176—17)

This application is a continuation of my earlier filed co-pending application Serial No. 712,512, filed January 31, 1958, and now abandoned.

This invention relates in general to nuclear reactors wherein a controlled fission chain reaction takes place, and more particularly it relates to an internal converter type nuclear reactor wherein some fissionable material is created by the conversion of a fertile material in the presence of a neutron flux.

In a nuclear reactor a neutron fissionable isotope such as $U^{233}$, $U^{235}$, and $Pu^{239}$ or mixtures thereof is fissioned by absorption of neutrons and a self-sustaining chain reaction may be established by the neutrons evolved from the fission if the mass of fissionable material is made sufficiently large. Specific details of the theory and essential characteristic of such reactors are set forth in Patent No. 2,708,656, issued to Enrico Fermi et al. on May 17, 1955.

An internal converter reactor, as used in this invention, is one wherein a fertile material contained within the reactor core is converted to a fissionable material by exposure to reactor generated neutrons where the quantity of fissionable material converted is less than the fissionable material which is consumed during a given period of operation of a fission chain reaction. An example of a fertile material which is convertible to a fissionable material is thorium which upon neutron capture is ultimately transformed to $U^{233}$. Specific details and characteristics of this transformation are set forth in Patent No. 2,798,847, issued to Enrico Fermi et al. on July 9, 1957.

Accordingly the present invention provides a nuclear reactor containing a supercritical mass of fuel containing a mixture of fertile and fissionable material disposed as a number of elongated and longitudinally contiguous fuel element assemblies of heterogeneous form geometrically arranged in a core to undergo a controlled chain type fission reaction. The reactor is formed by a vertically elongated pressure vessel of circular cross section. An upper and a lower grid plate are arranged within the pressure vessel transversely of its longitudinal centerline. The fuel element assemblies are separate, replaceable and individually removable and have end portions arranged to be fitted into the upper and lower grid plates. The upper grid plate is arranged to hold said fuel element assemblies in position irrespective of thermal expansion changes. Variable orifices are arranged in the lower grid plate to adjustably control the flow of a cooling fluid therethrough. The controls for the chain reaction are bottom mounted and vertically arranged to pass through the pressure vessel. Thermal shields are concentrically arranged about the core within the vessel and a light water filled neutron shield tank is arranged exteriorly about the pressure vessel.

Further, the present invention provides a multiplicity of control rod-fuel element assembly sets which form the core. Each of the sets comprising a plurality of separate and individually removable fuel element assemblies is symmetrically arranged to form therebetween an open ended centrally located control rod channel throughout the length of the assemblies. Control rods having a high neutron absorption cross section are arranged to be longitudinally positionable within the control rod channels. Control means are provided to position the control rods longitudinally of the core to maintain the controlled chain reaction.

Moreover this invention provides an arrangement whereby the fuel element assemblies making up the core are arranged in a number of symmetrically arranged longitudinally extending fuel concentration zones. While the fissionable to fertile material weight percent ratio is uniform in the fuel element assemblies within a zone, it is substantially different from zone to zone. However, the fissionable material in the fuel element assemblies throughout the core is enriched to substantially the same extent irrespective of the variation in the fissionable to fertile material weight percent ratio.

Additionally, the invention provides that each fuel element assembly has walls which are composed of a low thermal neutron absorption material and which form a flow chamber containing a large number of spaced fuel containing means.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

Figure 1:
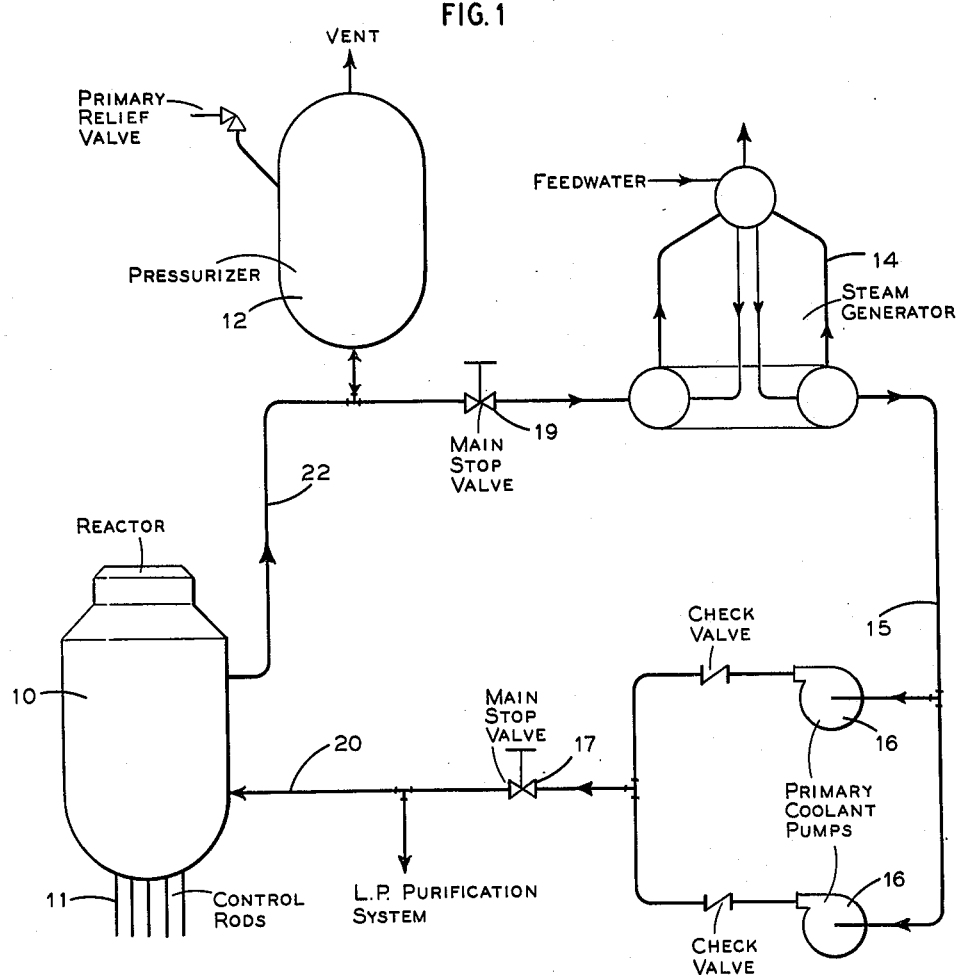
FIG. 1 is a schematic diagram showing the reactor of the invention within a heat transfer system.

In FIG. 1 there is shown the nuclear reactor of the present invention located in a heat transfer system for the generation of steam to be used in the production of electrical power. The system comprises a reactor 10 wherein heat is generated by a controlled chain type fission reactor and having bottom mounted control rods 11, a pressurizer 12, a steam generator 14 and primary coolant pumps 16. The reactor 10 receives pressurized water at a pressure of 1500 p.s.i. and 481° F. which has been taken from the steam generator 14 via lines 15, 20 by the primary coolant pumps 16. The primary coolant liquid flows through the reactor in heat transfer relationship with the fuel contained therein and is heated to 510° F. The heated water then leaves the reactor and flows through the line 22 to the steam generator 14 which is a type as described in the copending application of the common assignee No. 428,038 of D. K. Davies et al., filed May 6, 1954, now Patent No. 2,904,013 issued September 15, 1959. The primary coolant flows through the steam generator 14 in indirect heat exchange relationship with the secondary coolant to which passage it transfers the heat it received in its passage through the reactor. After its passage through the steam generator the secondary coolant exits as saturated steam at 405 p.s.i. The cooled primary coolant then flows through the line 15 to the coolant pumps 16 to complete the cycle.

The pressurizer 12 is an electrically heated boiler operating at 1500 p.s.i. and connected to the primary coolant system by a small line through which pressure is transmitted thereto.

Specific details of the theory and construction of the pressurizer 12 are set forth in the copending application of Donald F. Judd, Serial No. 715,432, filed February 14, 1958, now Patent No. 3,114,414 issued to the common assignee. Though the diagram in FIG. 1 sets forth only one primary coolant loop it is understood that a number of loops may be connected to the reactor and that the number of loops in use may be varied as required, by closing the main stop valves 17, 19 arranged in the lines 20 and 22.

An important requirement of a nuclear reactor used in the commercial generation of electrical power is that the reactor core have an extended operating lifetime. An example of a core with an extended operating lifetime would be one having a lifetime of approximately 600 full power days. In such a core it is necessary to provide an excess mass of fissionable material in addition to that required to sustain a fission chain reaction in a cold clean core, i.e., a reactor core in which a chain reaction has not been established. The excess mass of fissionable material is required to provide reactivity for temperature rise, build-up of neutron absorbing fission products, burnout of fuel and other miscellaneous reaction poisoning effects. To control the excess reactivity present within the reactor core a control system is required.

The control system for the reactor in the present invention comprises a primary system of bottom mounted control rods 11 supplemented by burnable and soluble poison disposed within the core. The bottom mounted control rods are disopsed within the reactor so that they may be adjustably positioned within the core. Control rod drive mechanisms are provided to position the control rods, either electro-mechanical or hydraulic systems, or the combination of both, may be used as the drive mechanisms, examples of which are illustrated and described in Patents Nos. 2,735,811, 2,708,656, 2,756,857, and 2,798,847. The control rod material, a substance which will absorb neutrons without reproducing them, may be selected from a group including hafnium, boron, stainless steel or an alloy of cadmium-indium and silver. An automatic control system comprising a pressure sensor, programmer, demand comparator and servo-control actuates the control rod drive mechanism. The control rods are arranged with a central regulator rod surrounded by a group of shim rods. The shim rods provide coarse adjustments in the reactivity of the reactor while the regulator rod accomplishes rapid, fine adjustment of the reactivity.

Burnable poisons are substances with high neutron capture cross section which have a capture reaction product of low capture cross section and which are introduced into a reactor to influence the long-term reactivity variations therein. In the present invention a burnable poison such as natural boron or europium is mixed with the fuel and acts as a poison to supplement the control rods in holding down excess reactivity. However, due to its nature it is consumed gradually by neutron absorption.

A soluble poison is one which can be introduced into the reactor in solution to absorb neutrons unproductively. In the present invention a supplementary control is obtained by dissolving a soluble poison, for example boric acid ($H_3BO_3$), in the primary coolant and regulating its strength by mechanical and chemical means instead of allowing nuclear burnout. Specific details of the theory, operation and contents of the control system are set forth in the copending application of John F. Mumm, Serial No. 721,404, filed March 14, 1958, by the common assignee, now abandoned.

Figure 2:
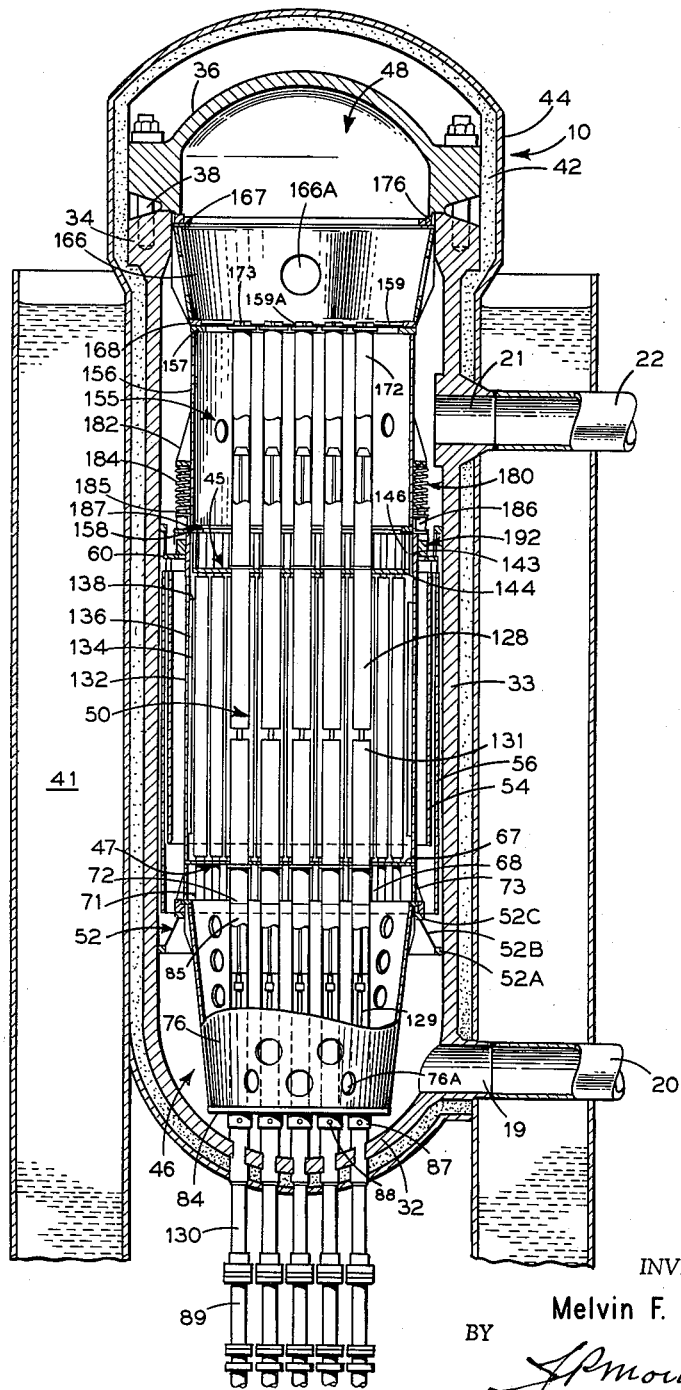
FIG. 2 is a vertical section through the reactor of the invention.

In FIG. 2 there is shown a preferred embodiment of the nuclear reactor 10 used in the commercial generation of steam. The nuclear reactor 10 comprises a vertically elongated pressure vessel of circular cross section which is connected to the primary coolant inlet line 20 at the nozzle 19 and to the outlet coolant line 22 at the nozzle 21. The vessel has a hemisperically shaped lower end 32, a circular wall 33 and a wall of increased cross section forming an upper flange 34. A plurality of threaded studs 38 connect a head member 36 to the flange 34 in pressure tight relationship. Both the pressure vessel and the head member are formed of carbon steel plate with a stainless steel cladding 39 on the inner faces thereof. A vertically extending annular shaped neutron shield tank 40 is formed about the pressure vessel enclosing the central portion thereof. A body of light water 41 is maintained in the tank 40 to provide a lateral neutron shield for the reactor. A layer of stainless steel wool insulation 42 is contained within a closely fitting can 44 and arranged about the walls 33 of the pressure vessel to reduce the heat loss from the reactor to the neutron shield tank 40.

The interior of the pressure vessel is generally divided into three zones by transversely arranged upper and lower grid plate assemblies 45, 47, respectively. These zones are a lower plenum chamber 46, and an upper plenum chamber 48, separated by a core chamber 50 which is disposed between the upper and lower grid plate assemblies.

The reactor internals contained within the pressure vessel 30 are divided into two classifications, first, permanent reactor internals which are integrally attached to the pressure vessel, and second, removable reactor internals.

The permanent reactor internals comprise a vertically disposed frusto-conically shaped support skirt 52 which provides the main support for the removable reactor internals and walls 54, 56 which form vertically extending concentrically arranged and radially spaced open ended cylinders which act as permanent thermal shields within the core chamber 50.

The removable reactor internals consist of a lower plenum chamber assembly arranged within the lower plenum chamber 46, an upper plenum chamber assembly arranged within the upper plenum chamber 48 and a core disposed within the core chamber 50 between the upper and lower grid plate assemblies 45, 47.

A multiplicity of elongated, longitudinally contiguous fuel element assemblies 92 of heterogeneous form are geometrically arranged as a core to undergo a controlled chain type fission reaction. The fuel element assemblies 92 comprise longitudinally elongated exterior walls 94 joined together to form open ended flow chambers 96 of substantially square cross section about six inches on a side. The walls 94 of Zircaloy–2, a material capable of withstanding the high temperatures generated by the chain type fission reaction and having a low absorption cross section for thermal neutrons. Two adjacent walls 94A, 94B forming the flow chamber 96 are inset for roughly two-thirds of their width extending from a common corner to form one recessed corner 94C which extends along the length of the fuel element assembly.

A large number of cylindrically shaped fuel pins 98 are arranged within the flow chamber 96 in parallel relationship with the longitudinal axis thereof. The fuel pins 98 comprise an open ended, cylindrically shaped stainless steel tube 100 having an outside diameter of 0.3125 inch and 0.02 inch wall thickness. Arranged within the tube 100 is a column of cylindrically shaped fuel pellets 102 stacked end to end. The fuel pellets 102 are a mixture of fully enriched uranium oxide ($UO_2$) and thoria ($ThO_2$) which has been compressed and sintered to yield a high density and machined to a close dimensional tolerance. An enriched uranium oxide is one in which the abundance of the $U^{235}$ isotope therein is increased above the amount it normally contains. A fully enriched uranium oxide is one that contains more than 90% of the $U^{235}$ isotope. The fuel pellets 102 have a diameter of .2675 inch and a length to diameter ratio of approximately one. The diameter of the fuel pellets is sufficiently smaller than the interior diameter of the fuel pin tube 100 to provide an annular space 104 between the tube 100 and the fuel pellet 102. An inert insulating pellet 106 of magnesium oxide or alumina is placed at each end of the column of fuel pellets. End plugs 108 are welded into the open ends of the fuel pin tubes 100 to form seals. The insulating pellet 106 serves to reduce the temperature gradient between the fuel pellets and the end plug, thereby reducing the stresses caused by differential expansion. The distance between the interior faces of the end plugs 108 within the tube 100 is greater than the height of the column of pellets 102, 106 to allow for the assembly and differential expansion of the pellets. A heat transfer medium, such as helium, lead, or sodium, is placed within the tube 100 to fill the voids and to reduce the temperature gradient across the voids caused by the spaces. The end plugs 108 secured within the ends of the tubes 100 have extensions 109 of reduced circular cross section.

Figure 5:
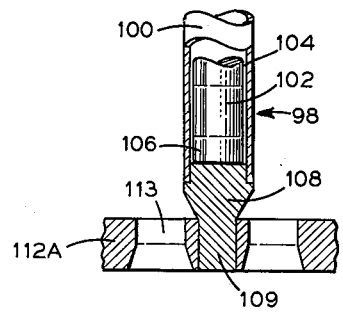
FIG. 5 is a partial enlarged section of a fuel pin and its connection to the fuel element assembly of FIG. 3.
Figure 4:
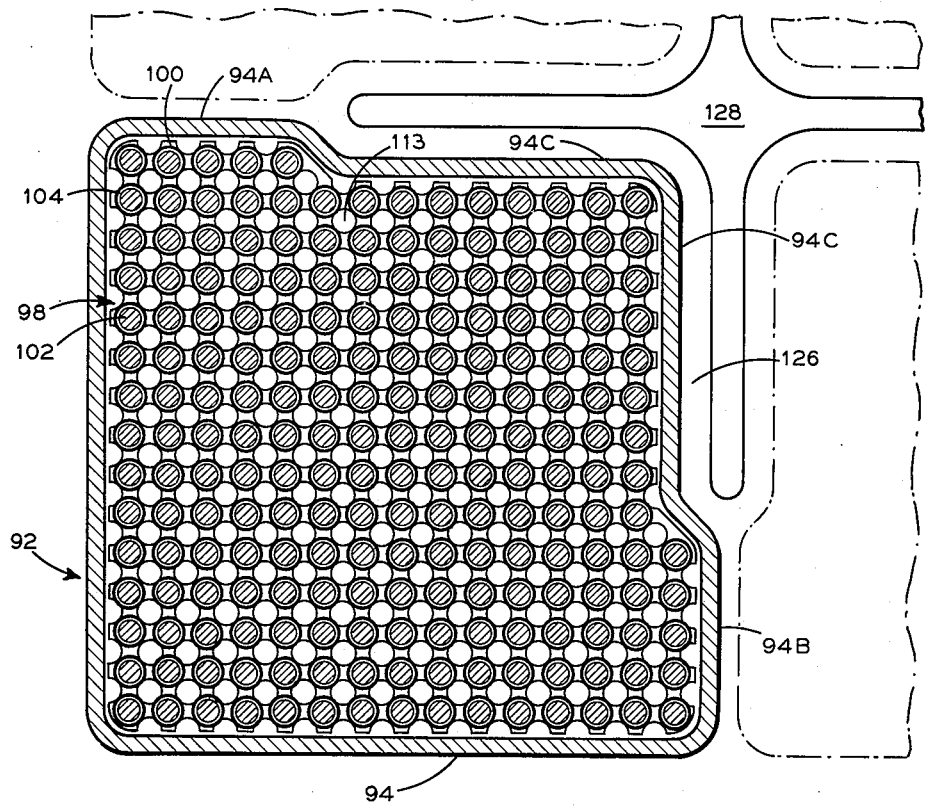
FIG. 4 is a greatly enlarged plan section taken along the line 4—4 of FIG. 3.

A number of pairs of spaced parallel tube sheets 112A, 112B are arranged within the walls 94 to receive and secure therebetween the fuel pins 98 by engaging the extensions 109 of the end plugs 108 within openings in the tube sheets. (See FIGS. 3 and 5.) The fuel pins 98 are arranged within the tube sheets 112A, 112B in a square lattice with a pitch of 0.3805 inch. Openings are located in the tube sheets between the connections of the fuel pins 98 to permit the flow of a coolant therethrough. The tube sheets and fuel pins cooperate to form fuel pin bundles having a cross section which substantially fills the cross sections of the flow chamber 96 within the walls 94. The fuel pin bundles are 16.5 inches long and have an active fuel region of 15 inches centered longitudinally in each pin 98. Six bundles are stacked end to end forming the fuel region of the fuel element assembly 92.

Figure 3:
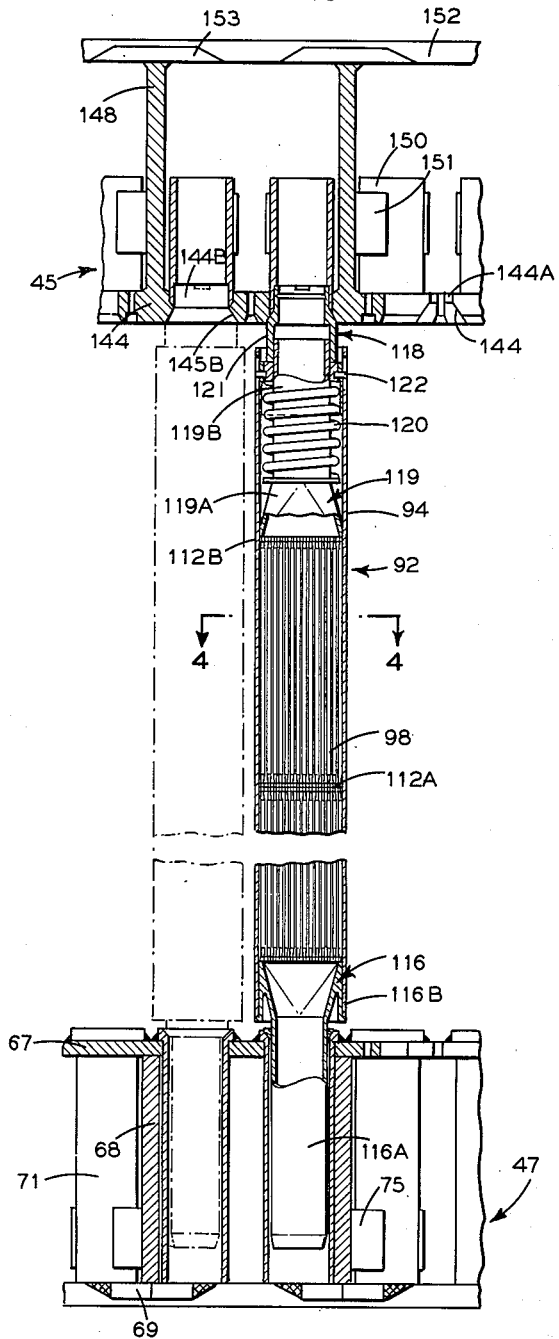
FIG. 3 is an enlarged scale partial vertical section showing the arrangement of the fuel element assemblies within the reactor of FIG. 1 taken along the lines 3—3 of FIGS. 10 and 11.

Each fuel element assembly has in inlet nozzle extension adapter 116 secured within one end of the flow chamber walls 94 (FIG. 3). The adapter has an inlet channel 116A of circular cross section arranged to be engaged in the lower grid plate assembly and a transition section 116B varying from circular to square cross section arranged within the flow chamber walls 94. The circular cross section portion 116A extends longitudinally and co-axially from the flow chamber walls 94.

The upper end of each assembly 92 has an outlet nozzle extension adapter 118 secured within the upper end of the flow chamber walls 94. The outlet nozzle extension adapter 118 comprises an interior transition sleeve 119, a spring 120 and an exterior nozzle extension 121. The exterior nozzle extension 121 has a circular cross section and is removably attached to the flow chamber walls by means of a bayonet lock 122 and extends longitudinally and co-axially from the flow chamber walls 94. The interior transition sleeve 119 is resiliently held in place and at one end is slidably engaged within the exterior nozzle extension 121 and on the other end bears on the tube sheet 112B of the fuel pin bundles. The interior transition sleeve 119 has a transition portion 119A varying from a square to a circular cross section and an outlet channel portion 119B of circular cross section. The spring 120 is arranged about the outlet channel portion 119B of the interior transition sleeve 119 to maintain the fuel pin bundles in position and against the exterior nozzle extension 121 on the other end to spring load the bayonet lock. The exterior nozzle extension 121 is engaged within the upper grid plate assembly and is also resiliently maintained in position by the spring 120. The outlet nozzle extension adapter 118 is arranged so that it may be easily removed for remote refueling of the fuel element assemblies. Additionally the spring loaded outlet nozzle extension adapter 118 provides a hold down against the hydraulic forces of the flowing coolant and allows for differential expansion between the fuel pin bundles and the flow chamber walls 94.

Control rod and fuel element assembly 124 (see circled portion of FIG. 6) are arranged in a symmetrical pattern to form the reactor core which has the generally cylindrical shape of the reactor pressure vessel wall 33. A groupling of four longitudinally contiguous identical fuel element assemblies 92 are arranged to form each control rod-fuel element assembly set 124. The four fuel element assemblies are spaced in a square arrangement with the recessed corner 94C of each fuel element assembly disposed in the center of the set to form a cross-shaped control rod channel 126 extending throughout the length of the set. This assembly pattern is repeated throughout the core (FIG. 6) plus some extra fuel element assemblies disposed about the periphery of the core to fill out and conform to the circular shape of the reactor vessel.

Figure 6:
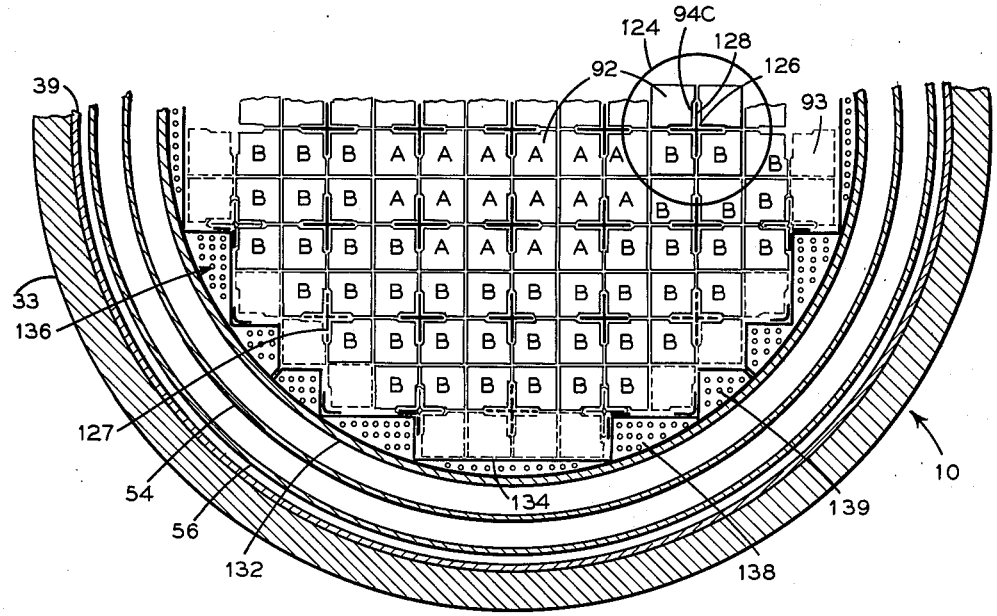
FIG. 6 is a greatly enlarged one-half plan section of the reactor vessel taken along the lines 6—6 of FIG. 2.

As shown in FIG. 6 the preferred core has one hundred twenty fuel element assemblies 92, having fissionable material and twenty-eight dummy element assemblies 93 (shown dotted) having no fissionable material therein. The dummy fuel element assemblies 93 have the same outside dimensions as the live fuel element assemblies but are arranged to control the flow of coolant in the core. The core is arranged so that the number of live fuel element assemblies may be increased from one hundred twenty to one hundred forty-eight should this prove necessary or desirable in the future.

The core fuel arrangement is best shown in the one-half section of FIG. 6 where the half not shown is exactly as the half shown. Therein the reactor 10 has two fuel concentration zones. Zone A is symmetrically arranged in the center of the core and contains thirty-two fuel element assemblies (marked with an A). Zone B is symmetrically disposed about zone A and contains eighty-eight fuel element assemblies (marked B). The fuel element assemblies within zone A contain a fuel having a mixture of 5.3 weight percent of fully enriched $UO_2$ and the rest $ThO_2$ while zone B fuel element assemblies contain a fuel mixture of 6.6 weight percent fully enriched $UO_2$ with the remainder $ThO_2$. The purpose of the two fuel concentration zone arrangement is to flatten flux gradient across the reactor and thereby provide a more uniform distribution of power in the core.

Control rods 128 of cross-shaped cross section are movably positioned within the core in the control rod channels 126 formed by the control rod-fuel element assembly sets 124. The control rods 128 are formed of four equal width arms disposed at right angles to each other. The overall width of each control rod is 7.5 inches with a thickness of $5/16$ inch and an active length of approximately 8 feet. The control rods as set forth above are formed of materials having a high neutron absorption cross section. The core contains a total of twenty-one control rods, one regulator rod disposed in the center of the core and twenty shim control rods disposed symmetrically thereabout. The control rod channels formed between the dummy assemblies 93 have placed therein stainless steel dummy rod 127 of substantially the same geometrical cross-section as the control rods to allow correct proportioning of coolant flow through the core. The control rods 128 are positioned within the core by means of a control rod drive mechanism (not shown) external of the reactor 10. A control rod drive shaft 129 (see FIG. 2) passes through each control rod nozzle extension 130 in the base 32 of the reactor vessel and is connected to a follower rod 131 which is in turn connected to the control rod 128. The follower rod 131 has substantially the same physical arrangement as the control rod 128 and is made of Zircaloy-2, a low neutron absorption material. As the control rod 128 is withdrawn from the core it travels upwardly into the upper plenum chamber 48 and its position within the core is taken by the follower rod 131. The follower rod 131 is provided to prevent the formation of large coolant flow spaces through the core when the control rods 128 are withdrawn. The control rod drive mechanism, not shown, is a fail safe type so that if there is a failure of the control rod drive mechanism system the control rod 128 will fall into the core and scram or shut down the reactor.

Figure 7:
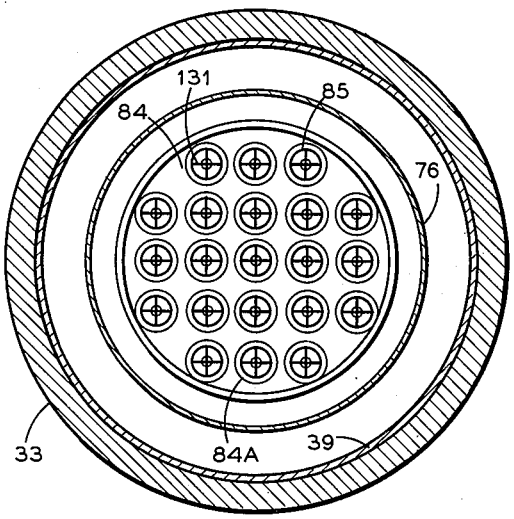
FIG. 7 is an enlarged plan section of the reactor vessel taken along the lines 7—7 of FIG. 2.

Vertically extending stainless steel walls which form an open ended right circular cylinder are disposed laterally about the core providing a removable thermal shield 132, as shown in FIGS. 2 and 7. The removable thermal shield 132 extends above and below a pair of spaced horizontal planes which define the upper and lower limits of the active fuel region of the core. Within the removable thermal shield 132 a core shroud 134 is arranged about the core. The core shroud 134 is formed of vertically arranged flat plate joined to form a continuous wall disposed about the outer periphery of the fuel element assemblies 92, 93. The core shroud 134 and the removable thermal shield 132 cooperate to form vertically extending flow passages 136 about the outer boundary of the fuel element assemblies 92, 93. Horizontally disposed core shroud baffle plates 138, see FIG. 6, having openings 139 therethrough are arranged between the core shroud 134 and the removable thermal shield 132 to limit the flow of primary coolant through the flow passages 136.

The permanent thermal shields 54, 56 (see FIGS. 2 and 6) are located exteriorly of the removable thermal shield 132. The permanent thermal shields 54, 56 extend downwardly from a horizontal plane passing through the lower face of the upper grid plate assembly 45 with the inner permanent thermal shield 54 terminating at a point roughly in a horizontal plane passing through the bottom limit of the active fuel region within the fuel element assemblies. The outer permanent thermal shield 56 extends below the inner thermal shield and terminates approximately in a horizontal plane through the upper portion of the support skirt 52.

Figure 8:
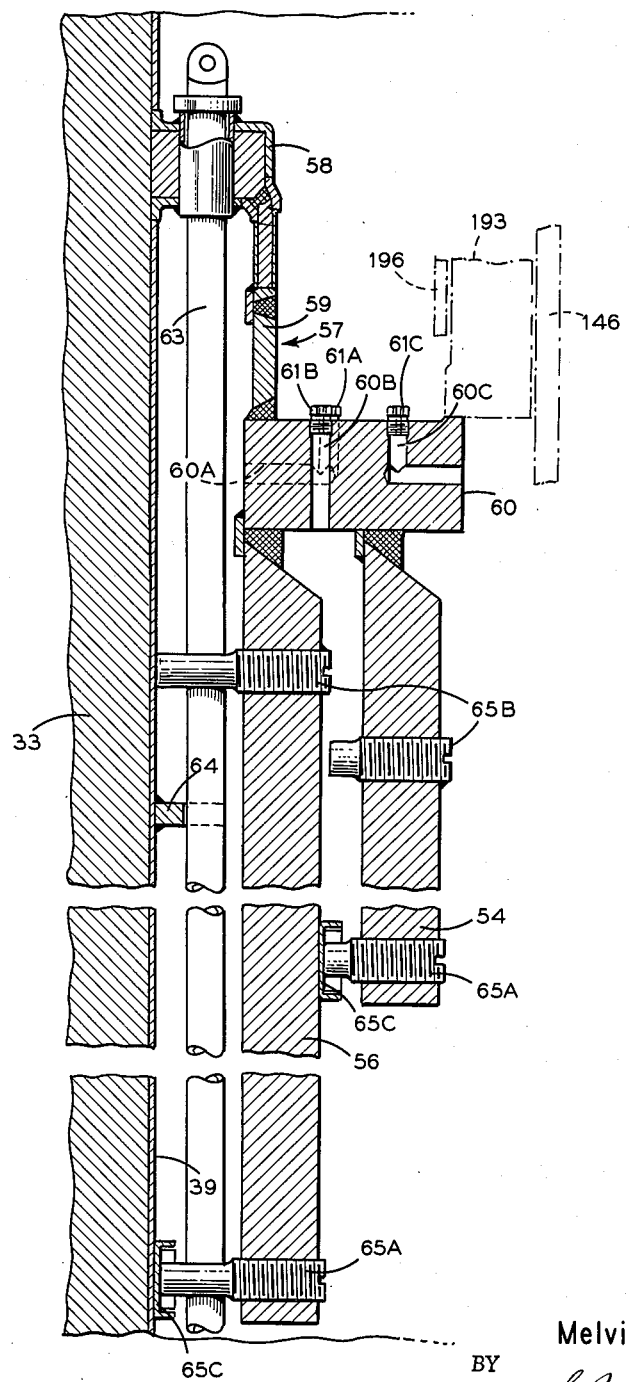
FIG. 8 is a greatly enlarged partial vertical section of the permanent thermal shield connection to the reactor vessel of FIG. 2.
Figure 9:
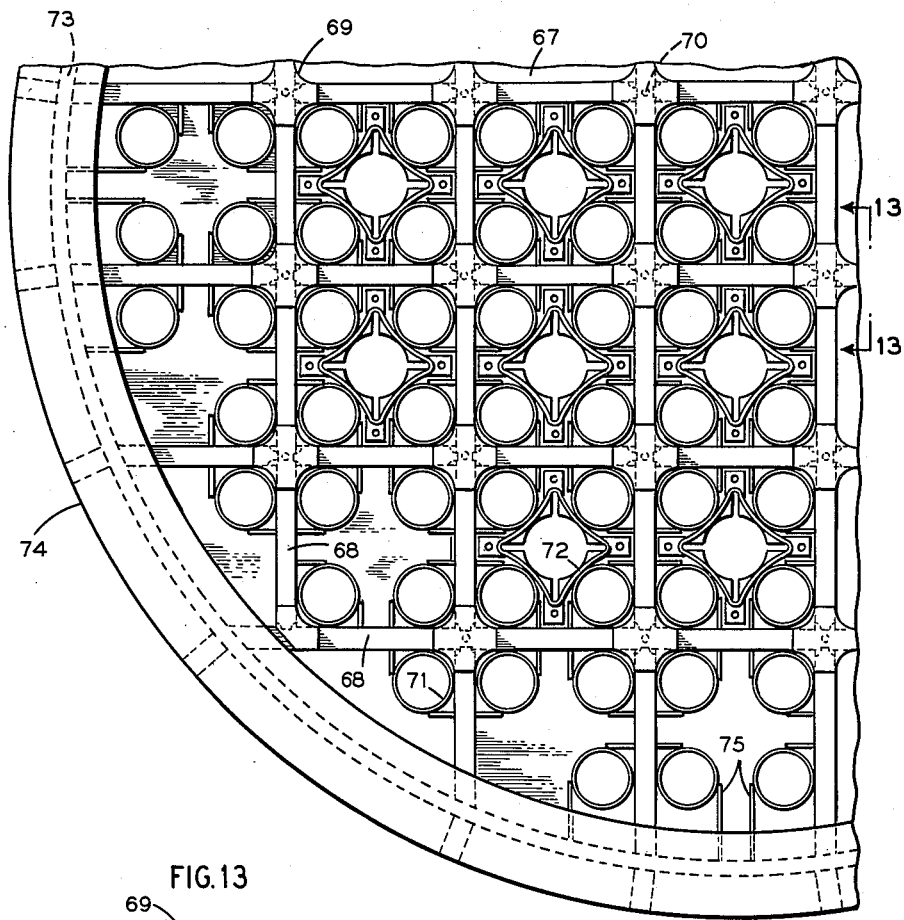
FIG. 9 is a greatly enlarged quarter view of the bottom face of the lower grid plate assembly.

Referring to FIG. 8 a permanent thermal shield support assembly 57 is integrally attached to the pressure vessel wall. The permanent thermal shield support assembly 57 comprises an annular ring 58 attached to the inner surface of the pressure vessel wall 33 and clad with stainless steel. A hanger support 59 formed as an open ended cylinder of relatively short height is welded to and extends downwardly from the annular ring 58. A circular permanent thermal shield support ring 60 is welded to the hanger support and in turn provides the immediate support for the permanent thermal shields 54, 56 which are welded thereto. Flow passages 60A, 60B, 60C having adjustable permanent shield orifice plugs 61A, 61B, 61C arranged therein are provided through the permanent thermal shield support ring 60 to control the amount of coolant flow passing therethrough. A vertically arranged tube 63 passes through and is supported by the ring 58, this tube will be used to contain instrumentation or material that is to be tested by exposure to radiation. An intermediate support 64 is formed on the pressure vessel wall 33 to support the tube 63. Set screw plugs 65A, 65B are adjustably arranged in the thermal shields 54, 56. Bearing pads 65C are located on the end of the set screw plugs 65A. The plugs 65A, 65B and pads 65C are for use in assembly only and do not provide structural support.

The support skirt 52 (see FIG. 2) is arranged in the upper portion of the lower plenum chamber 46 and comprises a number of support skirt lugs 52A, a support skirt baffle plate 52B and a support skirt bearing ring 52C. The support skirt lugs 52A are intermittently arranged in a horizontal plane and weldably attached to the pressure vessel wall 33. The intermittent spacing of the support skirt lugs 52A provides openings for coolant to pass from the lower plenum chamber to the spaces between the permanent and removable thermal shields 54, 56, 132.

The support skirt baffle plate 52B is formed by a frusto-conically shaped wall converging upwardly and welded to the support skirt lugs 52A around its lower end. The support skirt bearing ring 52C is horizontally arranged around and welded to the upper edge of the support skirt baffle plate 52B. The support skirt bearing ring 52C provides the support for the lower plenum chamber assembly which in turn supports the other removable reactor internals.

Referring to FIG. 2 the lower plenum chamber assembly is comprised of a lower grid plate assembly 47, an inlet flow baffle 76, an inlet flow baffle diaphragm plate 84 and a number of lower plenum chamber control rod guide tubes 85. The inlet flow baffle 76 is formed by a downwardly converging frusto-conically shaped wall. An inlet flow baffle support ring 78 is arranged about and integrally attached to the upper edge of the wall forming the inlet flow baffle 76 and is bolted to the lower grid plate assembly 47. The inlet flow baffle 76 has openings 76A therein to permit the flow of coolant therethrough and to insure uniform flow distribution. The inlet flow baffle diaphragm plate 84 is disposed horizontally across and attached to the bottom edge of the inlet flow baffle 76 forming a bottom closure. Openings 84A are arranged in the lower plenum chamber diaphragm plate 84 to permit control rod drive shafts 129 to pass therethrough.

Referring to FIGS. 2, 3, 9, 10 and 13, the lower grid plate assembly 47 is horizontally and co-axially arranged within the pressure vessel and is supported on the support skirt bearing ring 52C. The lower grid plate assembly 47 is composed of a lower grid plate 67, a lower grid plate honeycomb support element 68, a number of fuel element assembly inlet sleeves 71 and control rod guide tube sleeves 72, an open ended lower grid plate cylinder 73 and a lower grid plate bearing ring 74. The horizontally arranged bearing ring 74 is supported on the support skirt 52 and in turn supports the vertically upstanding open ended lower grid plate cylinder 73 which provides the peripheral container for the lower grid plate assembly. The lower grid plate 67 is horizontally disposed across the upper edge of the cylinder 73 and provides a wall between the lower plenum chamber 46 and the core chamber 50. The lower grid plate has openings 75A, 75B therein through which fuel element assemblies 92, dummy fuel element assemblies 93, and control rods 128 pass. Locating holes 75C are arranged in the lower grid plate 67 to position and secure the fuel element assembly inlet sleeves 71. Bolt holes 75D are provided in the lower grid plate 67 to attach the control rod guide tube sleeves 72 to the lower grid plate. The lower grid plate honeycomb support element 68 is constructed of a network of upstanding perpendicularly arranged and integrally attached plates disposed within and extending across the cross-sectional area of the cylinder 73. They honeycomb support element 68 is disposed normal to and below the lower grid plate 67 and has its upper edges in contact with the lower grid plate to provide support therefor. The honeycomb support element divides the lower grid plate 67 into sections having a horizontal cross section substantially equivalent to the cross section of the control rod-fuel element assembly sets 124. Variable orifices 70 are located through the lower grid plate at the intersection of the perpendicularly arranged honeycomb support element plate. Stiffener plates 69 are situated at the intersections of the lower edges of the plates forming the honeycomb support element 68 and attached thereto to maintain alignment and spacing. Vertically arranged fuel element assembly inlet sleeves 71 which receive the fuel element assembly inlet nozzle extension adapters 116 are attached within the openings in the lower grid plate 67. Vertically extending straps 75 are integrally connected to the fuel element assembly inlet sleeves 71 and to the vertical faces of the honeycomb support element plates 68 to provide alignment and rigidity for the sleeves.

A number of lower plenum chamber control rod guide tubes 85 of circular cross section are vertically disposed in the lower plenum chamber co-axial with control rod channels 126 in the core. The lower ends of the lower plenum chamber control rod guide tubes 85 re attached to the lower plenum chamber diaphragm plate 84 and the upper ends are connected to the control rod guide tube sleeves 72 which are bolted to the lower grid plate 67. The control rod guide tube sleeves 72 are formed by longitudinally flattening a cylinder having substantially the same cross section as the lower plenum chamber control rod guide tubes 85 to a section of roughly square cross section and having slightly concave sides. The control rod guide tube sleeves 72 and the lower plenum chamber control rod guide tubes 85 provide lateral support for the follower rod 131 and shaft 129 and also present a sealed flow chamber through the lower plenum chamber from the diaphragm plate 84 to the lower grid plate 67. A control rod nozzle seal 87 is disposed between the lower plenum chamber diaphragm plate 84 and the end 32 of the reactor pressure vessel and joins the control rod nozzle extensions 130 and the lower plenum chamber control rod guide tubes. An orifice 88 is positioned in the control rod nozzle seal 87 to admit coolant to the interior of the control rod guide tubes 85. At the opposite ends of the control rod nozzle extensions a buffer seal 89 is provided to minimize coolant leakage along the control rod drive shaft 129.

Figure 13:
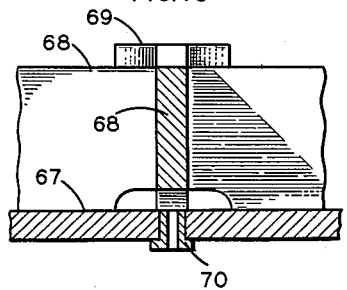
FIG. 13 is a partial vertical section of the lower grid plate assembly taken along the line 13—13 of FIG. 9.
Figure 10:
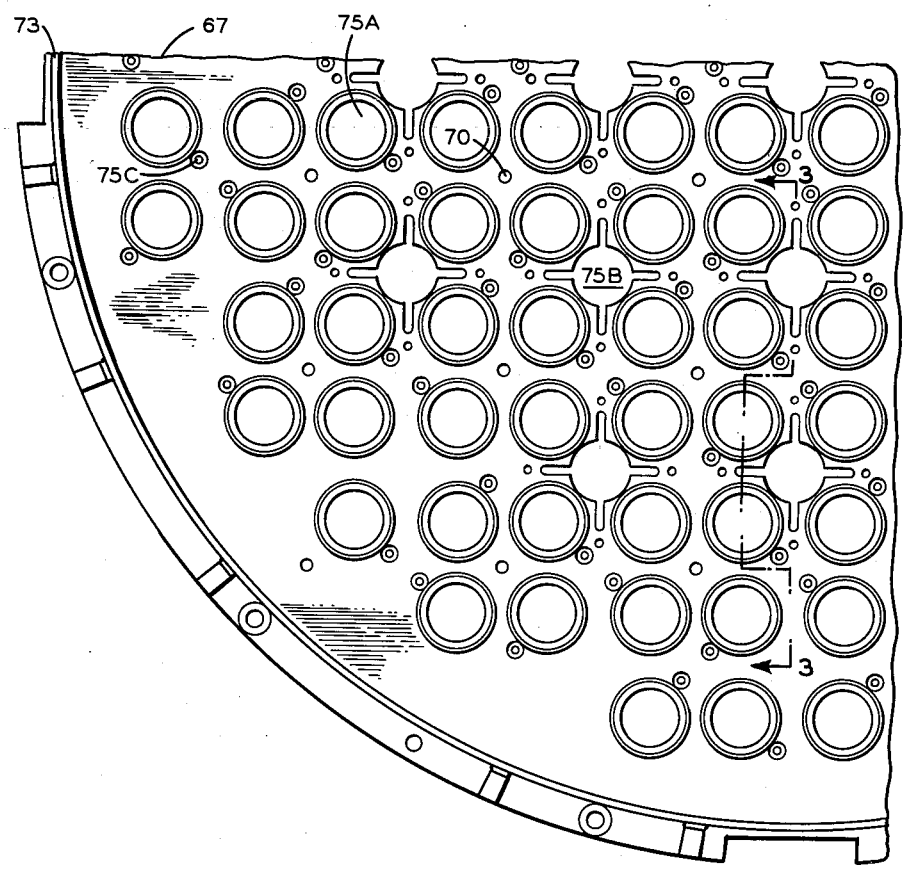
FIG. 10 is a greatly enlarged quarter view of the upper face of the lower grid plate assembly.
Figure 11:
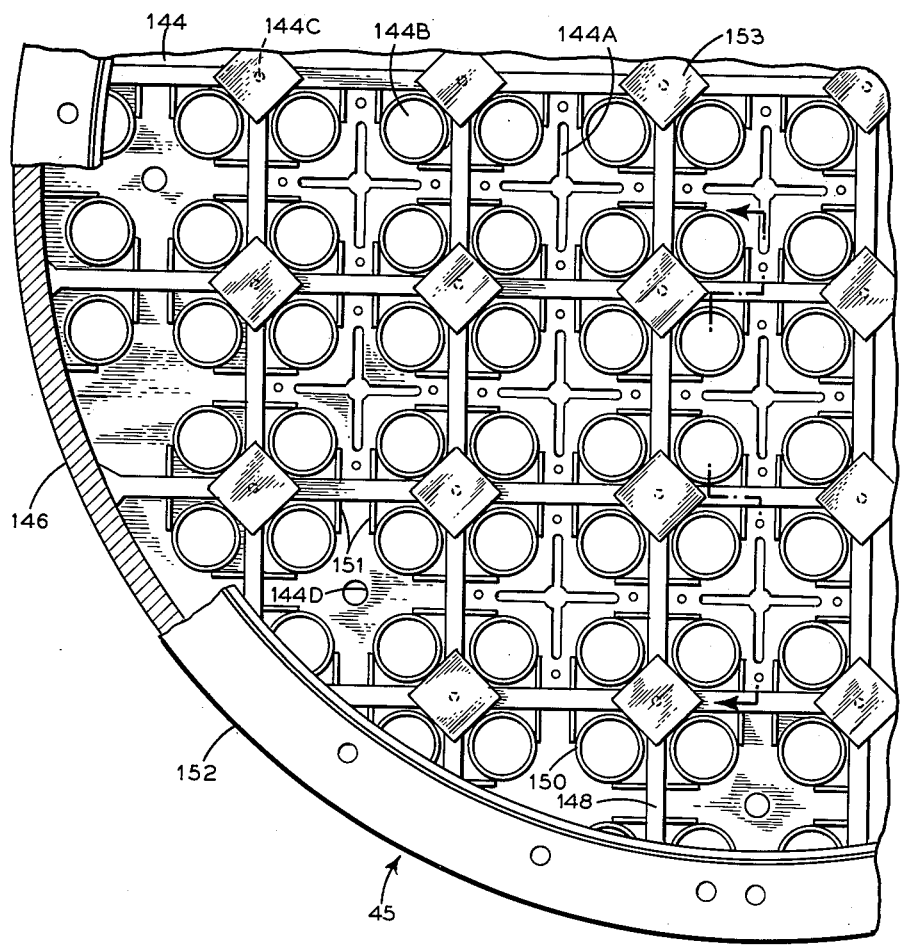
FIG. 11 is a greatly enlarged quarter view of the top face of the upper grid plate assembly.

The upper plenum chamber assembly as shown in FIGS. 2, 3 and 11 is comprised of an upper grid plate assembly 45, a transition section 155, an upper flow baffle 166, a number of upper plenum chamber control rod guide tubes 172, and a hold down spring and piston seal assembly 180. The upper grid plate assembly 45 is arranged concentrically within the removable thermal shield 132 providing an outlet annular space 143 therebetween for the flow of primary coolant from the core chamber 50 to the upper plenum chamber 48. The upper grid plate assembly 45 is arranged to receive the outlet nozzle extension adapters 118 of the fuel element assemblies 92 and to be supported by the fuel element assemblies. Referring particularly to FIGS. 3 and 11 the upper grid plate assembly 45 comprises an upper grid plate 144, an open ended upper grid plate cylinder 146, an upper grid plate honeycomb support element 148, a number of outlet fuel element assembly sleeves 150 and an upper grid plate bearing ring 152. The upper grid plate 144 is horizontally arranged within the reactor pressure vessel 10 and has circular openings 144B therein to receive and be supported by the outlet nozzle extension adapters 118 of the fuel element assemblies 92. The upper grid plate 144 provides a wall between the core chamber 50 and the upper plenum chamber 48. The upper grid plate 144 also has openings 144A to permit the control rods to pass vertically therethrough from the core into the transistion section 155 in addition to the openings 144B. The openings 144A, 144B through the upper grid plate have chamfers 145A, 145B on the core chamber side of the upper grid plate to permit the fuel element assemblies 92 and the control rods 128 to be aligned within the plate openings 144A, 144B during assembly. These chamfered openings 144A, 144B will prevent any damage to the structure of the fuel element assemblies 92 or control rods 128 caused by their being out of line while the removable reactor internals are being assembled. Variable orifices 144C are located in the upper grid plate 144 and are similar to those in the lower grid plate 67 as shown in FIG. 13. Holes 144D are provided in the plate 144 to receive dummy control rods.

Vertically arranged outlet fuel element assembly sleeves 150 are inserted within the upper end plate openings 144B and fixed at a position above the chamber 145B to receive the exterior nozzle extensions 121 of the fuel element assembly outlet nozzle adapters 118. Straps 151 are integrally connected to the fuel element assembly inlet sleeves 150 and to the vertical faces of the honeycomb support element plates 148 to provide alignment and rigidity for the sleeves 150.

The open ended vertically extending upper grid plate cylinder 146 is supported about and welded to the periphery of the upper horizontal face of the upper grid plate 144 to provide a peripheral container for the upper grid plate assembly 142. The upper grid plate honeycomb support element 148 is constructed of a network of vertically upstanding, perpendicularly arranged and integrally attached plates disposed within and extending across the cross-sectional area of the cylinder 146. The honeycomb support element 148 is disposed normal to and above the upper grid plate to provide support therefor. The honeycomb support element divides the upper grid plate into sections having a horizontal cross section substantially equivalent to the cross section of the control rod-fuel element assembly sets 124. Stiffener plates 153 are attached to the upper edges of the plates forming the honeycomb support element 148 at their intersections to maintain alignment and spacing. The upper grid plate bearing ring 152 is supported on and integrally attached to the upper grid plate cylinder 146 and has an outside diameter equal to that of the cylinder. The bearing ring 152 extends inwardly from the cylinder 146 and supplies structural support to the honeycomb support element 148 by providing a bearing surface about the periphery of the cylinder 146 for the upper edge faces of the plates which form the honeycomb support element 148.

The transition section 155 is supported by the upper grid plate assembly 45 and is formed by an open ended transistion section cylinder 156 which has an outside diameter and wall thickness substantially equal to that of the upper grid plate cylinder 146, and an upper and a lower support ring 157, 158 disposed respectively about the upper and lower horizontal edge of and extending inwardly from the outer surface of the transition cylinder 156. Openings 156A are disposed through the transition section cylinder 156 to permit flow of coolant therethrough. A transition section diaphragm plate 159 having a number of openings 159A is horizontally arranged across the upper end of the transition section cylinder 156 to provide a closed end therefor. The upper plenum chamber control rod guide tubes 172 are attached to the upper grid plate and extend vertically upward through the transition section 155 to the transition section diaphragm plate 159 and are secured within its openings 159A. The control rod guide tubes 172 are of circular cross section and have a cap plate 173 disposed across the diaphragm plate end of the tubes. An orifice 174 is provided in the cap plate 173 to permit coolant flow to exit from the upper plenum chamber control rod guide tubes.

Upper flow baffle 166 is formed by an upwardly diverging wall of frusto-conical shape. Top and bottom upper baffle support rings 167, 168 are horizontally disposed, respectively, about the upper and lower horizontal edges of the upper flow baffle 166 walls. The upper flow baffle 166 has at its lower edge substantially the same outside diameter as the transition section cylinder. The upper flow baffle 166 is supported by the transition section 155 through the bottom upper baffle support ring 168 which bears on the upper transition section support ring 157. A hold down ring assembly 176 is positioned in the upper region of the upper plenum chamber 48 and is disposed within the pressure vessel joint. The pressure vessel closure head 36 rests on the upper face of the hold down ring assembly 176. The hold down ring assembly 176 in turn rests on the top upper baffle support ring 167 and cooperates to maintain the removable reactor internals in position. Openings 166A are located through the upper flow baffle 166 to permit primary coolant flow therethrough.

Figure 12:
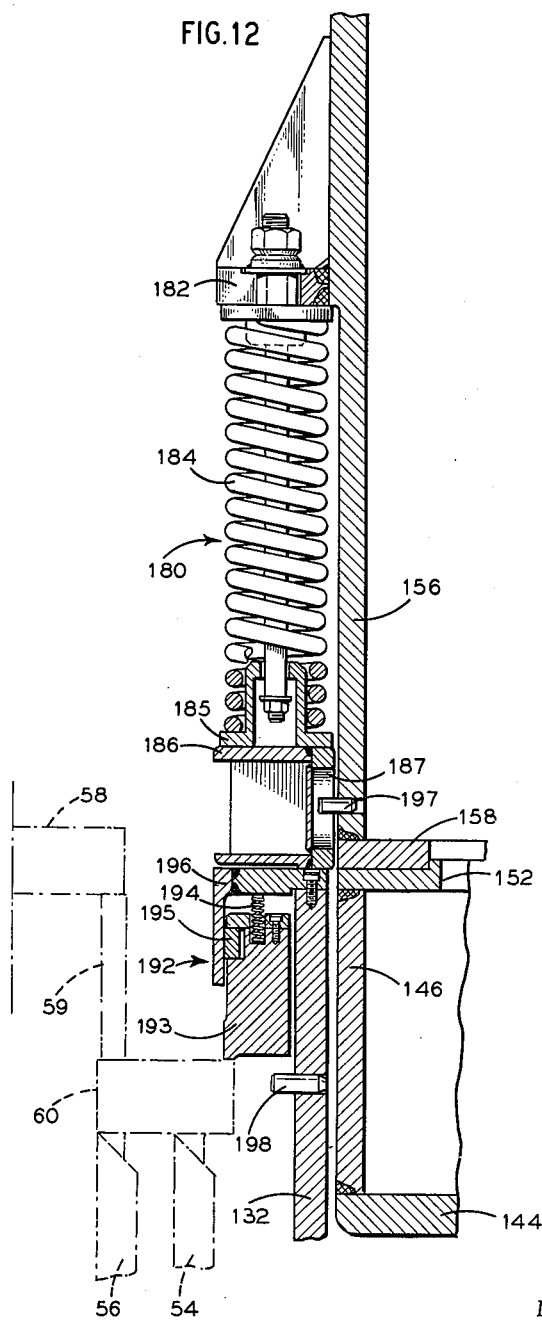
FIG. 12 is greatly enlarged partial vertical section of the hold-down spring and piston seal assembly of the upper plenum chamber assembly of FIG. 2.

Referring to FIGS. 2 and 12, a hold down spring and piston seal assembly 180 is attached to the outer surface of the transition section cylinder 156 to provide a seal between the upper plenum chamber 48 and that portion of the core chamber 50 arranged between the outer surface of the removable thermal shield 132 and the inner face of the reactor pressure vessel wall 33 within the core chamber 50. The hold down spring and piston seal assembly 180 comprises a hold down spring bracket 182, a hold down spring 184, a spring bearing block 185, an orifice seal ring 186, and a piston seal assembly 192. The hold down spring bracket 182 is weldably attached to the outer surface of the transition section cylinder 156 and the hold down spring 184 is mounted therein. The hold down spring 184 acts between the bracket 182 and the bearing block 185; the bearing block acts downwardly on the orifice seal ring 186 which is concentrically arranged about the bottom of the transition section cylinder 156. An orifice seal ring annular space 187 is disposed between the orifice seal ring 186 and the transition section cylinder 156 to limit the flow therethrough from the core chamber 50 which flow passes between the upper grid plate cylinder 146 and the inner face of the removable thermal shield 132. The orifice seal ring 186 bears on the piston seal assembly 192 whtich in turn is supported on the upper edge of the removable thermal shield 132 and on the permanent thermal shield support ring 60 and cooperates with the support ring to form a circular seal between the core chamber 50 and the upper plenum 48 chamber. The piston seal assembly consists of an annular shaped seal block 193, resilient means 194 to retain the seal block in position, a piston ring 195 and a vertically arranged cylindrically shaped cooperating surface 196 which combines with the piston ring to provide a seal. When hydraulic lift forces and differential expansion place the hold down spring 184 in compression, the orifice seal ring 186 maintains the annular space 187 formed about the transition section cylinder 156, and the piston seal assembly 192 resiliently maintains the seals between the core chamber 50 and the upper plenum chamber 48. A number of dowels 197 are positioned in the transition section cylinder 156 to assist in the removal of the orifice seal ring 186 on reactor disassembly. Similarly, a number of pins 198 are positioned in the removal thermal shield 132 to aid in the removal of the piston seal assembly 192 on reactor disassembly.

Although the invention has been described as to the physical shape and arrangement of parts, its operation can best be understood by the following description of its operation. Under full load operating conditions, 126,000 g.p.m. of light water as a primary coolant at a pressure of 1500 p.s.i.a. is circulated through the reactor pressure vessel 10. Approximately 85% of the total flow passes in heat transfer relationship with the fuel element assemblies to remove the heat of fission and the remaining 15% is diverted past the control rods 128, the exterior of the fuel element assemblies and about the thermal shields 54, 56, 132. There is a flow of the primary coolant throughout the entire volume of the reactor pressure vessel.

Primary coolant is delivered to the lower plenum chamber 46 in the reactor pressure vessel through the inlet connection 19 located through the reactor pressure vessel walls 33. The flow distribution of the primary coolant is directed by means of the inlet flow baffle 76 through the lower plenum chamber 48 for its passage to the core chamber 50. There are several passageways the coolant may follow as it courses through the core chamber 50.

The greater part of the primary coolant passes through the openings 76A in the inlet flow baffle 76 and flows to the lower grid plate 67. About 85% of the total primary coolant flow passes through the inlet fuel element assembly sleeves 71 in the lower grid plate 67 to the flow chambers 96 within the fuel element assemblies 92 with another 13% flowing around the assemblies. This 13% of the primary coolant enters the core through the orifices 70 in the lower grid plate 67, and through the control rod guide tubes 85. The coolant which enters the flow chamber of the fuel element assemblies 92 flows therethrough in heat transfer relationship with the fuel pins 98. The coolant within the flow chamber passes through the openings 113 in fuel pin tube sheets 112A, 112B and circulates about the individual fuel pins 98. After the coolant exits from the flow chamber 96 through the outlet nozzle extension adapter 118 it enters the interior of the transition section cylinder 156 within the upper plenum chamber. The openings 156A provided in the transition section 155 permit the primary coolant to flow to the outlet connection 21 arranged in the upper plenum chamber 48.

In addition to the primary coolant which enters the core through the orifices 70 in the lower grid plate 67, an additional quantity of the coolant enters the core chamber 50 through the lower plenum chamber control rod guide tubes 85. Coolant is admitted to the control rod guide tubes 85 through the orifices 88 in the control rod nozzle seals 87. The coolant entering the core through the lower grid plate orifices 70 and through the control rod guide tubes 85, circulates through the spaces between the fuel element assemblies 92 and the control rods 128 and also passes about the periphery of the core and flow upwardly between the removable thermal shield 132 and the core shroud 134 passing through the core shroud baffle plates 138. This portion of the coolant leaves the core either through the upper plenum chamber control rod guide tubes 172 or through the annular space about the core. The coolant flowing through the upper plenum chamber control rod guide tubes 172 passes through the orifices 174 in the control rod guide tube cap plates 173 located in the transition section diaphragm plate 159 and then flows through the openings 166A in the upper flow baffle 166 to the outlet connection 21. The coolant which passes through the annular space enters the upper plenum chamber through the orifice seal ring 186 and then flows to the outlet connection 21.

The remaining coolant, which amounts to roughly 2%, flows through that portion of the core chamber between the outer face of the removable thermal shield 132 and the reactor pressure vessel wall 33. The coolant enters this space through the open spaces provided between the intermittently spaced support skirt lugs 52A. The coolant flows upwardly about the permanent thermal shields 54, 56 and the outer face of the removable thermal shield 132. Orifices 61A, 61B, 61C are in the permanent thermal shield support rings 60 to pass the coolant from the three flow channels formed between the concentrically arranged removable and permanent thermal shields 132, 54, 56 and the interior surface of the pressure vessel wall 33 within the core chamber 50 to the upper plenum chamber 48. This portion of the flow then passes to the outlet connections 21.

To further illustrate the preferred embodiment of the invention, the below Table I gives the details of the reactor.

TABLE I

| Reactor Date: | |
|---|---|
| Reactor Type | Internal Thorium Converter. |
| Neutron Energy | Thermal. |
| Reactor Heat Output, mw | 585. |
| Steam Condition From Reactor | 405 psig; 449° F. |
| Primary Coolant | Pressurized; Light Water. |
| Temperature, °F | 481 in; 510 out. |
| Flow, g.p.m | 126,000. |
| Pressure drop, p.s.i | 41 core; 116 total. |
| Pressures, p.s.i.a | 1,800 design; 1,500 operating. |
| Coolant Loops | Four 304 S.S. Loops. |
| | 2 Pumps/loop; 1 Boiler/loop. |
| Reactor Core: | |
| Life Full Power Days | 600. |

| Loading, Kg— | Initial | Final |
|---|---|---|
| $ThO_2$ | 17,400 | 17,100 |
| U-235 | 850 | 517 |
| U-233 | | 146 |

| | |
|---|---|
| Overall Conversion Ratio | 0.55. |
| Power Density, kw./l | 66. |
| Core Size | 6.5 ft. Diameter by 8.0 ft. High. |
| Average Heat Flux | B.t.u. 1 hr. ft$^2$; 112,000. |
| Fuel Element Materials: | |
| (a) Fuel | $ThO_2$—$UO_2$ mixture. |
| (b) Cladding | Stainless Steel. |
| (c) Transition pieces, tube sheets | 304 Stainless Steel. |
| (d) Springs | Inconel-X. |
| (e) Fuel Element Walls | Zircaloy-2. |
| Fuel Pellet diameter | 0.2675 in. nominal. |
| Cladding outside diameter | 0.3125 in. nominal. |
| Cladding thickness | 0.020 in. nominal. |
| Fuel pin spacing (square lattice) | 0.3805 in. nominal. |
| Pins per bundle | 206. |
| Bundles per fuel element | 6. |
| Fuel Elements in core | 120. |
| Fuel Element Wall Thickness | 0.180 in. nominal. |
| Heat transfer area | 15,170 sq. ft. |
| Metal to water ratio | 1.122. |
| Core—Volume Percentages: | |
| Water (Moderator and Coolant) | 48. |
| Zircaloy | 11. |
| $ThO_2$—$UO_2$ | 27. |
| Control Rods | 2. |
| Stainless Steel (Cladding and tube sheets) | 12. |

Although the present invention has been described using light water as the coolant moderator, it is contemplated that the apparatus and arrangements may be effectively used when employing other primary coolants, such as heavy water, organic liquids, and liquid metals.

The preferred embodiment illustrated utilizes a mixture of highly enriched uranium oxide and thoria; however, it is contemplated that the invention will effectively operate using mixtures of fissionable material, such as Uranium 233 and Plutonium 239 with fertile material such as Uranium 238 and natural uranium. Moreover, the invention should not be limited to oxides of the fissionable and fertile material but it contemplates the metallic form of these materials either as pins or plates. Additionally, the invention would be equally effective where the fissionable material would take the form of mixtures of the various known fissionable materials, such as 2% of $U^{233}$ and 3.3% of $U^{235}$.

The control rod-fuel element assembly sets 124 have been illustrated as containing four assemblies placed around a centrally located control rod 128, but it is contemplated that the invention would be equally effective if more or less than this number of assemblies were located around a centrally located rod. For instance, the fuel element assemblies may take the shape of triangles and be arranged generally in a pentagon shape so that there would be five assemblies arranged about a cross-control rod having five blades thereon.

The materials of the fuel element pin tube or cladding and of the walls 94 forming the flow chamber of the assembly 92 may be constructed of any of the relatively low thermal neutron cross-section materials presently known, such as the various Zircaloys 2, 3, 4 or zirconium, aluminum, and magnesium.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. In a nuclear reactor a supercritical mass of fuel containing a mixture of enriched uranium and additional fertile material, said mixture arranged in a core to undergo a controlled chain type fission reaction, the invention comprising a plurality of uniformly constructed elongated and longitudinally contiguous fuel element assemblies of heterogeneous form, each of said assemblies containing said mixture of enriched uranium and fertile material and with the enriched uranium therein being of substantially uniform enrichment throughout said core, said fuel element assemblies within said core divided into a number of symmetrically arranged longitudinally extending fuel concentration zones, each of said zones having a uniform fissionable to fertile material weight percent ratio in the fuel element assemblies positioned therein, whereas fuel element assemblies positioned in different zones have a substantially different fissionable to fertile material weight percent ratio and contributing a substantial portion of the power initially developed in the core.

2. In a nuclear reactor a supercritical mass of fuel containing a mixture of enriched uranium and additional fertile material, said mixture arranged in a core to undergo a controlled chain type fission reaction, the invention comprising a plurality of uniformly constructed elongated and longitudinally contiguous fuel element assemblies of heterogeneous form, each of said assemblies containing said mixture of enriched uranium and fertile material and with the enriched uranium therein being of substantially uniform enrichment throughout said core, said fuel element assemblies within said core divided into a centrally arranged inner fuel concentration zone and at least one annular shaped outer fuel concentration zone disposed concentrically about said inner zone, each of said inner and outer zones having a uniform fissionable to fertile material weight percent ratio in the fuel element assemblies positioned therein, whereas fuel element assemblies positioned in different zones have a substantially different fissionable to fertile material weight percent ratio with the ratio being lowest in the inner zone and increasing outwardly with each zone, and each zone contributing a substantial portion of the power initially developed in the core.

3. In a nuclear reactor a supercritical mass of fuel containing a mixture of uranium oxide ($UO_2$) which is enriched in the fissionable isotope ($U^{235}$) and thorium oxide ($ThO_2$), said mixture arranged in a core to undergo a controlled chain type fission reaction, the invention comprising a plurality of uniformly constructed elongated and longitudinally contiguous fuel element assemblies of heterogeneous form, each of said assemblies containing said mixture of enriched uranium oxide and thorium oxide and having the uranium oxide of substantially uniform enrichment throughout the core, said fuel element assemblies within said core divided into a centrally arranged inner fuel concentration zone and at least one annular shaped outer fuel concentration zone disposed concentrically about said inner zone, each of said inner and outer zones having a uniform enriched uranium oxide to thorium oxide weight percent ratio in the fuel element assemblies positioned therein, whereas fuel element assemblies positioned in different zones have a substantially different enriched uranium oxide to thorium oxide weight percent ratio with the ratio being lowest in the inner zone and increasing outwardly with each zone, and each zone contributing a substantial portion of the power initially developed in the core.

4. In a nuclear reactor a supercritical mass of fuel containing a mixture of enriched uranium and additional fertile material, said mixture arranged in a core to undergo a controlled chain type fission reaction, the invention comprising a plurality of uniformly constructed elongated and longitudinally contiguous fuel element assemblies of heterogeneous form, each of said assemblies containing said mixture of enriched uranium and fertile material, said fuel element assemblies within said core divided into a number of symmetrically arranged longitudinally extending fuel concentration zones, and each of said zones having a uniform fissionable to fertile material weight percent ratio in the fuel element assemblies positioned therein, whereas fuel element assemblies positioned in different zones have a substantially different fissionable to fertile material weight percent ratio and each zone contributing a substantial portion of the power initially developed in the core.

References Cited by the Examiner
UNITED STATES PATENTS

| | | | |
|---|---|---|---|
| 2,870,076 | 1/1959 | Koch | 176—17 |
| 2,920,025 | 1/1960 | Anderson | 176—65 |
| 2,975,117 | 3/1961 | Zinn | 176—18 |
| 2,982,713 | 5/1961 | Sankovich et al. | 176—61 |
| 2,990,349 | 6/1961 | Roman | 176—42 |
| 2,992,174 | 7/1961 | Edlund et al. | 176—88 |
| 2,992,982 | 7/1961 | Avery | 176—17 |

REUBEN EPSTEIN, *Primary Examiner.*
CARL D. QUARFORTH, LEON D. ROSDOL,
*Examiners.*